US006287378B1

(12) United States Patent
Fairchild et al.

(10) Patent No.: US 6,287,378 B1
(45) Date of Patent: Sep. 11, 2001

(54) METHOD OF PRODUCING SYNTHETIC SILICATES AND USE THEREOF IN GLASS PRODUCTION

(75) Inventors: George Henry Fairchild, Bethlehem; John Albert Hockman, Bath, both of PA (US)

(73) Assignee: Minerals Technologies, Inc., Bethlehem, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 54 days.

(21) Appl. No.: 09/001,335

(22) Filed: Dec. 31, 1997

Related U.S. Application Data

(63) Continuation-in-part of application No. 08/708,246, filed on Sep. 3, 1996, now abandoned.

(51) Int. Cl.$^7$ .................................................. C04B 3/076
(52) U.S. Cl. .......................... 106/600; 106/601; 106/796; 106/800; 501/133
(58) Field of Search ................................... 106/600, 601, 106/800, 796; 423/331, 326, 333, 334; 264/141, 142, 143, 117, 118; 501/133, 27, 31, 29, 55

(56) References Cited

U.S. PATENT DOCUMENTS

| | | |
|---|---|---|
| 2,621,131 | 12/1952 | Lathe . |
| 3,082,102 * | 3/1963 | Cole et al. .............................. 501/27 |
| 3,381,064 | 4/1968 | Yamaguchi et al. . |
| 3,458,331 | 7/1969 | Kroyer . |
| 3,520,705 | 7/1970 | Shido et al. . |
| 3,682,666 * | 8/1972 | Lacourrege ............................ 501/29 |
| 3,802,901 | 4/1974 | Robertson et al. . |
| 3,817,776 * | 6/1974 | Gringras ................................. 501/29 |
| 3,875,288 * | 4/1975 | Hoffman et al. ...................... 423/118 |
| 3,883,364 | 5/1975 | Robertson et al. . |
| 3,926,647 | 12/1975 | Wuhrer . |
| 3,941,574 * | 3/1976 | Melkonian et al. .................... 501/27 |
| 3,956,446 | 5/1976 | Eirich et al. . |
| 3,967,943 | 7/1976 | Seeley . |
| 4,023,976 * | 5/1977 | Bauer et al. ............................ 65/27 |
| 4,028,131 * | 6/1977 | Pons ........................................ 501/31 |
| 4,252,754 | 2/1981 | Nakaguchi . |
| 4,474,594 | 10/1984 | Lazet . |
| 4,519,814 * | 5/1985 | Demarest, Jr. ........................... 65/27 |
| 4,612,292 * | 9/1986 | Richard .................................. 501/27 |
| 4,634,461 * | 1/1987 | Demarest, Jr. et al. ................. 65/27 |
| 4,920,080 | 4/1990 | Demarest, Jr. . |
| 5,004,706 | 4/1991 | Dickinson . |
| 5,100,840 * | 3/1992 | Urabe et al. ........................... 501/27 |
| 5,900,052 * | 5/1999 | Nakajima ............................. 106/626 |

FOREIGN PATENT DOCUMENTS

| | | |
|---|---|---|
| 141 105 | 8/1978 | (DE) . |
| 4228500 * | 3/1994 | (DE) . |
| 53-139621 * | 12/1978 | (JP) . |
| 55-149122 | 11/1980 | (JP) . |
| 59-064563 * | 4/1984 | (JP) . |
| 02141454 * | 5/1990 | (JP) . |
| 09285849 * | 11/1997 | (JP) . |
| 10291852 * | 11/1998 | (JP) . |
| 644 731 | 1/1979 | (SU) . |
| 823 285 | 4/1981 | (SU) . |
| 981 217 | 12/1982 | (SU) . |
| 340 257 | 5/1983 | (SU) . |

OTHER PUBLICATIONS

Mirkovich, V.V.; "Utilization of Diopside in the Manufacture of Glass," *Mines Branch Technical Bulletin TB* 192; Dept. of Energy, Mines and Resources (Ottawa, Canada 1974).

Mirkovich, V.V.; et al.; "Utilization of Diopside in the Manufacture of Glass, Part II"; *Journal of Canadian Ceramic Society;* vol. 44, pp. 43–47; (1975).

"sand", *Hawley's Condensed Chemical Dictionary*, (12$^{th}$ Edition, 1993) p. 1020.

"sand", *The American Heritage College Dictionary*, (3$^{rd}$ Edition, 1993) p. 1207.

"Glass", Kirk–Ohmer, Encyclopedia of Chemical Technology, 4th Ed 1994, vol. 12, pp. 555–569, 593–601.

* cited by examiner

*Primary Examiner*—Paul Marcantoni
(74) *Attorney, Agent, or Firm*—Marvin J. Powell; Terry B. Morris

(57) ABSTRACT

A method is disclosed of producing a synthetic silicate. The method is advantageous in providing material useful in glass making. Such method involves the reaction of calcium oxides and magnesium oxides, water and sodium silicates. The glass formation is performed at a lower temperature than usual and performed with a lower amount of volatile gas release. Less cristobalite formation in the glass occurs. The synthetic silicate produced can be a cylindrical pellet.

9 Claims, No Drawings

METHOD OF PRODUCING SYNTHETIC SILICATES AND USE THEREOF IN GLASS PRODUCTION

This is a continuation-in-part application of U.S. Ser. No. 08/708,246, filed Sep. 3, 1996, status—abandoned.

FIELD OF INVENTION

The present invention relates to glass making compositions and methods. More particularly, the present invention relates to an alkali metal precursor material made from calcium oxides and magnesium oxides, water and sodium silicates, such as silica sand. Such material is particularly useful in glass making and affords using lower energy with less volatiles associated with conventional production batches.

BACKGROUND OF THE INVENTION

Glass can be produced from glass formers, which can be theorized under the random-network theory of glass as material having heavy cation - oxygen bond strengths greater than about 335 kilo Joules per mole. Typical formers are oxides such as $B_2O_3$, $SiO_2$, $GeO_2$, $P_2O_5$, $As_2O_5$, $P_2O_3$, $As_2O_3$, $Sb_2O_3$, $V_2O_5$, $Sb_2O_5$, $Nb_2O_5$, and $Ta_2O_5$. The fluoride $BeF_2$ also qualifies. Additional components can be mixed with glass formers to provide various effects. These components include glass intermediates, having bond strengths of about 250–350 kilo-Joules/mole, and which may or may not become part of the network; and glass modifiers, having bond strengths of less than about 250 kilo Joules per mole, and which do not become part of the network. Typical modifiers are oxides of gallium, magnesium, lithium, zinc, calcium, sodium and potassium. Other formers, intermediates and modifiers are known, as illustrated in "GLASS", *Kirk-Othmer Encyclopedia of Chemical Technology*, vol. 12, pp 555+(1994).

One form of glass is a silicate system containing modifiers and intermediates. Such silicates have a network of silicon to oxygen to silicon bonds. Use of a modifier, such as sodium oxide, can cleave these bonds by forming a silicon to oxygen to terminal sodium linkage. Other modifiers can be used. Such modifiers can make the glass more fluid, decrease resistivity, increase thermal expansion, lower chemical durability or increase flux.

Soda-lime glass is perhaps the most ubiquitous glass product. Such soda-lime glasses involve mixtures of alkali and alkali earths. These glasses can be produced using oxides of sodium, calcium, silicon, magnesium, aluminum, barium and potassium.

Most glass is manufactured by a process in which raw materials are converted at high temperatures to a homogeneous melt that is then formed. The raw materials used are typically sand, as the source of silicon; limestone or dolomitic lime, as the source of calcium and/or magnesium; and soda ash or caustic soda, as the source of sodium. The limestone is typically a high calcium limestone (95% calcite, $CaCO_3$), aragonite mineral, or a dolomitic limestone (mixture of dolomite, $CaMg(CO_3)_2$, and calcite). The soda ash (sodium carbonate, $Na_2CO_3$) can be a Solvay process product or mineral deposit. Typical manufacturing processes involve the batch mixing of sand, soda ash, limestone and other materials at elevated temperatures above 1000° C.

There is a continued need for new processes and materials which facilitate the production of glass and which provide energy savings and increased production through-put.

RELATED ART

U.S. Pat. No. 5,004,706 discloses a method of making molten glass wherein silica is heated with a batch component comprising a sodium alkaline earth silicate which includes a major portion of the sodium in the resultant molten glass. The patent also discloses a batch component for use in glass manufacture, comprising sodium calcium silicate, and, optionally, sodium magnesium silicate. A method for producing a batch component comprising sodium calcium silicate is also disclosed, comprising heating a mixture of a source of sodium oxide, a source of silica, and either a source of calcium silicate or a source of calcium oxide at a temperature of greater than about 800° C., with a $Na_2O$, $CaO$, and $SiO_2$ molar ratio of 1:1:1. The resulting batch components can be preheated without melting prior to mixing and feeding the furnace.

U.S. Pat. No. 4,920,080 discloses a method of making glass in which silica is reacted with sodium carbonate to form sodium silicate as a preliminary step. The resulting sodium silicate is combined with a calcium carbonate - containing batch material which has been preferably calcined to release carbon dioxide prior to contacting with the sodium silicate. The patent suggests that the process maximizes the recovery of waste heat from glass melting and that the resulting batch materials are substantially free of carbon dioxide which minimizes gaseous inclusions in the glass.

U.S. Pat. No. 4,023,976 discloses an improved process for making glass in which a glass batch is mixed with a binder, aged, compacted, and compressed into briquettes, which are heated to partially react the contents of the batch in a prereaction stage. This process minimizes segregation and non-uniformity in the glass batch, and reduces the operating temperature of the glass furnace.

U.S. Pat. No. 3,883,364 discloses a dust-free granular alkaline earth carbonate material particularly suited for feed stock for glass furnaces. The process for preparing the granular material involves combining a freshly prepared aqueous slurry of alkaline earth carbonate with a solution of alkali silicate, drying the slurry and sintering at temperature of about 700–900° C., thereby converting the aqueous slurry solids to a dense material which can be ground to a dust-free, free flowing form suitable for use as a feed stock in glass furnaces.

U.S. Pat. No. 3,967,943 discloses a method of improving glass batch melting by using sodium silicate water solution as a batch ingredient to supply from about 1% to about 10% of the total $Na_2O$ content, with conventional sodium-containing batch materials supplying the bulk of the $Na_2O$ content. The patent suggests that the addition of sodium silicate water solution enables a lower temperature and/or less fuel to be used in melting, results in lower dusting, and reduces the incidence of glass inhomogeneities or defects.

SUMMARY

The present invention is a method of producing a molten ceramic by use of a synthetic silicate, wherein the synthetic silicate is produced by mixing a slaked source of calcium and/or magnesium and a source of silicon dioxide. Preferably, the synthetic silicate can be made by a soluble silicate route or a silica sand route. Advantageously, the synthetic silicate can be formed into a cylindrical pellet.

In accord with one or more aspects, the invention provides energy savings and other benefits, including, but not limited to, reduced levels of evolved carbon dioxide and reduced foam formation in glass making processes, reduced impurities in formed glass, increased furnace pull rates, and customized elemental ratios in the produced glass and improved batch uniformity.

EMBODIMENTS OF THE PRESENT INVENTION

One embodiment of the present invention is a method of producing a molten ceramic comprising the step of admixing a slaked source of calcium and/or magnesium with a source of silicon dioxide to produce a silicate material (hereinafter "synthetic silicate") comprising one or more compounds selected from the group consisting of calcium silicates, magnesium silicates and calcium magnesium silicates. This synthetic silicate can be a precursor material in the production of glass or other ceramic products. The synthetic silicate optionally contains free water which can be residual water from the slaking process producing the slaked source of calcium and/or magnesium. The method further comprises admixing under appropriate production conditions the synthetic silicate and a second source of silicon dioxide to produce a molten ceramic material. The second source of silicon dioxide can be the same as the source used to produce the synthetic silicate or can be a different source.

The molten ceramic produced is dependent upon the selection of materials and the corresponding ceramic production conditions. The molten ceramic is preferably a glass precursor suitable for making glass products including, but not limited to, glassware, glass bottles, glass windows (e.g. building, vehicular and the like), fiberglass, optical glass, optical fiber and the like, and for other glass products, such as those produced by the addition of aluminum, boron, gallium and the like.

The source of calcium and/or magnesium can be any type of a natural or synthesized material capable of being slaked by water; such as an oxide of calcium and/or magnesium which reacts with water. Such sources may be natural forms of oxides of calcium and/or magnesium or processed materials which has been ground, calcined or otherwise treated. Non-limiting examples are wollastonite ($CaO \bullet SiO_2$), diopside ($CaO \bullet MgO \bullet 2SiO_2$), akermanite ($2CaO \bullet MgO \bullet 2SiO_2$), calcium metasilicate ($CaO \bullet SiO_2$), calcined dolomite (i.e., dolomitic lime, $CaO \bullet MgO$), and lime (CaO) in its various forms, e.g., quicklime, hydrated lime, hydraulic lime and high calcium lime (i.e., 95% or more active).

A preferred selection of the source of calcium and/or magnesium includes dolomitic lime and high calcium lime. The calcium and/or magnesium source can be slaked with water at ambient temperatures or pressures. Higher temperatures and pressures can be used. When more than one type of calcium and/or magnesium source is used, the sources may be mixed before, during or after slaking. The amount of water used preferably is at least a stoichmetric amount for complete slaking and can be an amount of water in excess such that the slaked source of calcium and/or magnesium comprises an amount of free (unreacted) water.

The source of silicon dioxide can be any convenient source of silicon dioxide which enables the admixing with the specified slaked source to produce the synthetic silicate. For instance, the source can be one in which the silicon dioxide is relatively unassociated with other compounds, exemplified as silica in natural materials such as sand, quartz, and the like. Alternatively, the source can be one in which the silicon dioxide is relatively associated with other compounds, exemplified as silicon dioxide in sodium silicates.

In addition to the source of silica, there may also be needed one or more of a source of calcium, magnesium and sodium to complete the production of glass or other ceramic material. For instance, one or more of limestone, dolomite and soda ash materials might be used. This depends upon the desired composition. The use of such materials can result in the release of volatile gases, such as carbon dioxides, in the production and, accordingly, use of such is desired to be minimal.

The admixing of the slaked source of calcium and/or magnesium and the source of silicon dioxide can be performed simultaneously with or after the slaking to produce the slaked source. The proportion of the source of calcium and/or magnesium, water for slaking and the source for silicon dioxide can be varied to produce a variety of synthetic silicates. The preferred weight ratio of water to the source of calcium and/or magnesium during slaking will vary in accordance with the desired product, as well as the water temperature for the slaking.

The admixing of the water and the source of calcium and/or magnesium can be in either order of one to the other or concurrent. The time of admixing of the silicon dioxide and the slaked source of calcium and/or magnesium can preferably range from about 5 seconds to about 2 hours, more preferably about 10 seconds to about 30 seconds.

The admixing and continued mixing, if any, of the silicon dioxide and the slaked source of calcium and/or magnesium is effective to produce a synthetic silicate suitable for the production of glass or other ceramic. When an excess of water (e.g. free water) is present, the material is in a slurry form. Depending upon the composition and type of glass or other ceramic to be formed using the synthetic silicate, additional material can be added to the slurry during or after admixing or mixing. For instance, if additional silica is desired, a silica source, such as silica flour, can be added. Also, before such synthetic silicate is used in glass production, the slurry can be treated, such as by filtering, evaporating or heating, to remove at least a portion of the free water. For instance, the slurry could be dried at a temperature of about 110° C.

The synthetic silicate can be further treated by heating at higher, temperatures, such as from about 110° C. to about 1100° C. or higher. The time and ramping of such heating can be varied, depending upon the desired final synthetic silicate inasmuch as such heating can produce further or continued reactions.

The synthetic silicate produced by the present invention can have a wide variety of one or more calcium silicate, magnesium silicate and calcium magnesium silicate components. The variability of such silicate components correlates with the variability of amounts of the source of calcium, magnesium, water and the silicon dioxide, as well as the conditions of operating, e.g., temperatures, pressures, time, mixing, etc.

Soluble Silicate Route

One embodiment of the present invention is a method of producing a molten glass comprising the step of admixing a slaked source of calcium and/or magnesium and a soluble silicate to produce a synthetic silicate. This synthetic silicate optionally contains free water, which can be residual from the slaking process. The method further comprises mixing the synthetic silicate and a source of silicon dioxide, preferably silica, to produce a glass product.

A preferred selection of source of calcium and/or magnesium is dolomitic lime and high calcium lime. The calcium and/or magnesium source can be slaked with water at ambient temperatures or pressures. Higher temperatures and pressures can be used. When more than one type of calcium and/or magnesium source is used, the sources may be mixed before, during or after slaking. The amount of water used preferably is at least a stoichmetric amount for complete slaking and can be an amount of water in excess such that the slaked source of calcium and/or magnesium comprises an amount of free (unreacted) water.

The soluble silicate is a silicate having sufficient solubility in water to enable the silicate to react with the slaked source of calcium. A preferred soluble silicate is a sodium silicate. Such sodium silicate can be dry or liquid and anhydrous or hydrated, preferably pentahydrated.

In addition to the source of silicon dioxide, there may also be needed one or more of a source of calcium, magnesium and sodium to complete the production of glass. For instance, one or more of limestone, dolomite and soda ash materials might be used. This depends upon the desired glass composition. The use of such materials can result in the release of volatile gases, such as carbonates, in the glass production and, accordingly, use of such is desired to be minimal.

In one preferred embodiment, the sodium silicate is an anhydrous or hydrated form of a compound having the empirical formula of $Na_2O \bullet X\ SiO_2$, wherein X ranges in value from 0.5 to 3.75; preferably, $Na_2O \bullet SiO_2$, $Na_2O \bullet SiO_2 \bullet 5H_2O$ and $Na_2O \bullet 10/3SiO_2$. When the sodium silicate is anhydrous, the sodium silicate is preferably admixed with the slaked source of calcium after completion of the slaking process.

The admixing of the slaked source of calcium and/or magnesium and the soluble silicate can be performed simultaneous with or after the slaking to produce the slaked source. The proportion of the source of calcium and/or magnesium, water for slaking and soluble silicate can be varied to produce a variety of calcium synthetic silicates. In a preferred embodiment, the source of calcium and/or magnesium is a blend of dolomitic lime and high calcium lime. The proportion of the blend can vary, preferably the weight ratio of dolomitic lime to high calcium lime ranges from about 100:1 to about 1:100, more preferably from about 4:1 to about 2:1. The preferred weight ratio of water to lime during slaking is about 10:1 to about 0.35:1, more preferably about 2.5:1 to about 1:1. The water temperature for the slaking of the calcium source is preferably from about 10° C. to about 90° C., more preferably about 20° C. to about 30° C.

The admixing of the water and the source of calcium and/or magnesium can be in either order of one to the other or concurrent. Preferably, the water is added to the source of calcium and/or magnesium over a period of time, such as from about 5 seconds to about 2 hours, preferably about 30 seconds. The slaking time is preferably from about 1 minute to about 60 minutes, more preferably about 2.5 minutes to about 10 minutes.

The amount of the soluble silicate to be admixed with the slaked source of calcium and/or magnesium preferably ranges in the weight ratio of soluble silicate to slaked source of calcium and/or magnesium (dry) of from about 0.044 to about 2.2, more preferably about 0.048 to about 1.2. The time of admixing of the soluble silicate and the slaked source can preferably range from about 5 seconds to about 2 hours, more preferably about 10 seconds to about 30 seconds. The admixture of soluble silicate and slaked source is preferably treated to continued mixing of from about 5 minutes to about 2 hours, more preferably about 30 minutes to about 1 hour.

The admixing and continued mixing, if any, of the soluble silicate and the slaked source of calcium and/or magnesium is effective to produce a synthetic silicate suitable for the production of glass. When an excess of water (e.g. free water) is present, the material is in a slurry form. Depending upon the composition and type of glass to be formed using the synthetic silicate, additional material can be added to the slurry during or after admixing or mixing. For instance, if additional silica is desired, a silica source, such as silica flour, can be added. Also, before such synthetic silicate is used in glass production, the slurry can be treated, such as by filtering, evaporating or heating, to remove at least a portion of the free water. For instance, the slurry could be dried at a temperature of about 110° C.

The synthetic silicate can be further treated by heating at higher, temperatures, such as from about 110° C. to about 1100° C., more preferably from about 150° C. to about 700° C., even more preferably below about 300° C. The time and ramping of such heating can be varied, depending upon the desired final synthetic silicate inasmuch as such heating can produce further or continued reactions.

The synthetic silicate produced by the use of soluble silicates can have a wide variety of one or more calcium silicate, magnesium silicate, and/or magnesium components. The variability of components correlates with the variability of amounts of the source of calcium, water and the soluble silicate, as well as the conditions of operating, e.g., temperatures, pressures, time, mixing, etc. In one preferred embodiment, the synthetic silicates have the formula $Na_ACa_BMg_C(O)_D(OH)_ESi_FO_G \bullet XH_2O$ wherein either D or E is zero and the other subscripted letters vary according to conditions as previously described. Table I discloses, in a non-limiting way, the possible correlations attainable between operating amounts and synthetic silicate attainable.

TABLE I

| | Weight Ratios | | |
|---|---|---|---|
| Lime | Water | Soluble Silica | Product |
| 1 | 1 | 0.5 | $Ca_5(OH)_2 \cdot Si_6O_{16} \cdot 4H_2O$ |
| 1 | 1 | 0.7 | $Ca_5(OH)_2 \cdot Si_6O_{16} \cdot 4H_2O$ |
| 1 | 3.3 | 1.2 | $Ca_5(OH)_2 \cdot Si_6O_{16} \cdot 4H_2O$ |
| 1 | 3.3 | 0.7 | $(CaO)_{1.5} \cdot SiO_2 \cdot H_2O$ |
| 1 | 3.3 | 1.2 | $(CaO)_{1.5} \cdot SiO_2 \cdot H_2O$ |
| 1 | 7 | 1.1 | $CaO \cdot SiO_2 \cdot H_2O$ |

In a preferred embodiment, the synthetic silicate produced by soluble silicates comprises one or more components represented by the formula $(CaO)_x \bullet SiO_2 \bullet Y\ (H_2O)$, wherein x is from 5/6 to 3/2 and Y is not zero. More preferably x is 1.5 and Y is 1.

In another preferred embodiment, the synthetic silicate produced by soluble silicates comprises one or more components represented by the formula $X(Na_2O) \bullet Y(CaO) \bullet SiO_2$ and optionally comprises a compound represented by the formula $W(Na_2O) \bullet V(MgO) \bullet SiO_2$, wherein X and W independently are from 1/6 to 1/1 and W and V independently are from 1/3 to 1/1. Preferably, the synthetic silicate precursor material comprises $0.5(Na_2O) \bullet 1(CaO) \bullet SiO_2$. More preferably, the synthetic silicate precursor material further comprises $Na_2O \bullet MgO \bullet SiO_2$.

In another aspect, the present invention is the setting of process variables of the disclosed reactions within a set of novel process variables to attain desired results. Accordingly, the present invention can be the above-described invention wherein the proportion of the amount of synthetic silicate and the amount of the source of silicon dioxide is effectively controlled to reduce the temperature required to produce a molten glass within a set time. Alternatively, the proportion of the amount of synthetic silicate and the amount of the source of silicon dioxide is effectively controlled to reduce the time required to produce a molten glass at a set temperature. In another aspect, both temperature and time are reduced by effectively controlling the aforesaid proportions. The variables which compose the foregoing variables can also be controlled. For instance, a molten glass is produced by setting variables from the set of variables consisting of the amount of slaked source of calcium and/or magnesium, the amount of soluble silicate, the amount of free water, the amount of the source of silicon dioxide, the time to produce the molten glass, and the temperature to produce the molten glass. Once a certain number of the variables have been set, the remaining are fixed in accordance with the degree of freedom. Depending upon the glass composition desired, the amounts of other sources of calcium, magnesium or sodium, such as limestone, dolomite and soda ash, may also be change in accordance with the change of these variables.

The following examples are to illustrate, but not limit, the scope of the present invention when using a soluble silicate.

EXAMPLE 1

The following is a method for producing an admixture of sodium calcium silicate and sodium magnesium silicate. The reaction takes place in a paddle mixer. A magnesium oxide and calcium oxide source consisting of 37.2 grams dolomitic lime (55.1% CaO; 42.5% MgO) and 13.2 grams high calcium lime (96% active) are premixed in the mixer. To the mixing oxides is added 210 grams of dry sodium metasilicate pentahydrate. This provides enough silicon dioxide to react with all the magnesium and calcium oxide in a 1:1 molar ratio. Into this dry mix is introduced 50 grams water. The slurry is allowed to mix for 30 minutes. Upon completion of the reaction the free water is removed in a kiln at 110° C. The dried material is then heated to 400° C. in a kiln. The phases formed in this reaction were confirmed by x-ray defraction (XRD) to be $Na_2MgSiO_4$ and $Na_2Ca_2Si_2O_7$.

EXAMPLE 2

This method exemplifies wherein a $Na_2MgSiO_4$ and $Na_2Ca_2Si_2O_7$ precursor is used in glass. The glass formulation followed is 74.1% $SiO_2$, 13.3% $Na_2O$, 8.6% CaO, and 4.1% MgO. The precursor material consists of 100% of the needed $Na_2O$, CaO and MgO, and 21% of the required $SiO_2$. Therefore, to 50 grams precursor material is added 67.9 grams $SiO_2$ as sand. A control consisting of the above mentioned glass formulation using calcium carbonate as the CaO source, magnesium carbonate as MgO source, and soda ash as the $Na_2O$ source is created. Two groups of these mixtures are then heated to 1300° C. and 1400° C., respectively, for times of 1, 3, 6, and 12 hours. The glass samples are ground up and XRD performed on them. The % amorphous glass for these samples are as follows.

|  | 1300° C. Experimental | Control | 1400° C. Experimental | Control |
|---|---|---|---|---|
| 1 hour | 90 | 80 | 98 | 85 |
| 3 hour* | 98 | 90 | 98 | 85 |
| 6 hour | — | — | 98 | 95 |
| 12 hour | — | — | 99 | 99 |

*The control percentage is greater (e.g. 90 compared to 85) at the lower temperature at this time and temperature due to cristobalite formation dynamics.

EXAMPLE 3

The following is a method for synthesizing a calcium silicate hydrate. The reaction takes place in a paddle mixer. 300 grams dolomitic lime consisting of 55.1% CaO and 42.5% MgO is slaked with 500 grams water for 10 minutes in the paddle mixer. Separately, 100 grams of high calcium lime is slaked with 500 grams water for 10 minutes. Both samples are screened through a 60 mesh screen. Into the mixer is placed 400 ml of the dolomitic slake and 500 ml of the high calcium slake. To the mixing slakes is added 945 grams liquid N-type sodium silicate. The sodium silicate is introduced over 5 seconds. The sodium silicate provides enough soluble silica to react in a 1:1 molar ratio with all the MgO and CaO. The slurry is allowed to mix for 60 minutes. Upon completion of the reaction the free water is removed in a kiln at 110° C. The dried material is then heated to 400° C. in a kiln. The phase formed in this reaction is confirmed by XRD to be $(CaO)_{1.5}SiO_2 \bullet H_2O$ along with unreacted MgO and excess sodium silicate.

EXAMPLE 4

The method wherein a $(CaO)_{1.5}SiO_2 \bullet H_2O$ precursor is used in glass. The glass formulation followed is 74.1% $SiO_2$, 13.3% $Na_2O$, 8.6% CaO, and 4.1% MgO. The precursor material consists of 100% of the needed CaO and MgO, 21% of the required $SiO_2$, and 35% of the required $Na_2O$. Therefore, to 20 grams precursor material is added 36.1 grams $SiO_2$ and 9 grams soda ash. A control consisting of the above mentioned glass formulation using calcium carbonate as the CaO source, magnesium carbonate as the MgO source, and soda ash as the $Na_2O$ source is created. Two groups of these mixtures are then heated to 1300° C. and 1400° C., respectively, for times of 1, 3, 6, and 12 hours. The glass samples are ground up and XRD performed on them. The % amorphous glass for these samples are as follows.

|  | 1300° C. Experimental | Control | 1400° C. Experimental | Control |
|---|---|---|---|---|
| 1 hour | 95 | 80 | 98 | 85 |
| 3 hour* | 98 | 90 | 99 | 85 |
| 6 hour | — | — | 99 | 95 |
| 12 hour | — | — | 99 | 99 |

*The control percentage is greater at the lower temperature at this time and temperature due to cristobalite formation dynamics.

Silica Sand Route

Another preferred embodiment of the present invention is a method of producing a molten glass comprising the step of admixing a slaked source of calcium and/or magnesium screened of impurities (such as by a sizing step) and a source of silicon dioxide, preferably silica, and then heating the admixture at high temperatures to produce synthetic silicate (i.e., a calcium magnesium silicate, magnesium silicate, and/or calcium silicate). The method can further comprise mixing the synthetic silicate and a second source of silica and a source of sodium, preferably soda ash, to produce a glass product. This second source of silica may be the same or differ from silica sand.

The source of calcium and/or magnesium can be any type of a natural or synthesized material capable of being slaked by water; that is, an oxide of calcium and/or magnesium which reacts with water. Such sources may be natural forms of oxides of calcium and/or magnesium or processed materials which has been ground, calcined or otherwise treated. Non-limiting examples are wollastonite ($CaO \bullet SiO_2$), diopside ($CaO \bullet MgO \bullet 2SiO_2$), akermanite ($2CaO \bullet MgO \bullet 2SiO_2$), calcium metasilicate ($CaO \bullet SiO_2$), calcined dolomite (i.e., dolomitic lime, $CaO \bullet MgO$), and lime (CaO) in its various forms, e.g., quicklime, hydrated lime, hydraulic lime and high calcium lime (i.e., 95% or more active).

A preferred selection of source of calcium and/or magnesium is dolomitic lime and high calcium lime. The calcium and/or magnesium source can be slaked with water at ambient temperatures or pressures. Higher temperatures and pressures can be used. When more than one type of calcium and/or magnesium source is used, the calcium and/or magnesium sources may be mixed before, during or after slaking. Also, a portion of the calcium and magnesium may come from a calcite or dolomite source. The calcite or dolomite could be admixed to the lime prior or during slaking. The percentage of calcium and magnesium replaced by calcite or dolomite can be from 0% to 100%. The preferred range is from about 25% to about 50% when used. The advantage of using a calcium or magnesium carbonate is that it lowers the raw material costs. The amount of water used preferably is at least a stoichmetric amount for complete slaking and can be an amount of water in excess such that the slaked source of calcium comprises an amount of free (unreacted) water.

The slaked calcium and/or magnesium source can then be screened of impurities. The screen size can vary for about 10 mesh to about 325 mesh. More preferably, the screen size is about 30 mesh to about 60 mesh. Non-limiting examples of such impurities are iron particles, grit, refractory residue, inclusion, and other types of particles which do not melt in the glass batches.

A source of silica can be any type of natural or synthesized source of varying mesh sizes. Examples of silica sources include, but are not limited to, silica sand, silica flour, precipitated silica, and the like.

In addition to the source of silica, there may also be needed one or more of a source of calcium, magnesium and sodium to complete the production of glass. For instance, one or more of limestone, dolomite and soda ash materials might be used. This depends upon the desired glass composition. The use of such materials can result in the release of volatile gases, such as carbonates, in the glass production and, accordingly, use of such is desired to be minimal.

The admixing of the slaked source of calcium and/or magnesium and the silica sand can be performed simultaneous with or after the slaking to produce the slaked source. Preferably, the lime, carbonates, and silica sand are pulverized together prior to slaking. The proportion of the source of calcium and/or magnesium, water for slaking and silica sand can be varied to produce a variety of synthetic silicates. In a preferred embodiment the source of calcium and/or magnesium is a blend of dolomitic lime and/or high calcium lime. The proportion of the blend can vary, preferably the weight ratio of dolomitic lime to high calcium lime ranges from about 100:1 to about 1:100, more preferably from about 4:1 to about 2:1. The preferred weight ratio of water to lime during slaking is about 10:1 to about 0.35:1, more preferably about 2.5:1 to about 1:1. The water temperature for the slaking of the calcium and/or magnesium source is preferably from about 10° C. to about 90° C., more preferably about 20° C. to about 30° C.

The admixing of the water and the source of calcium and/or magnesium can be in either order of one to the other or concurrent. Preferably the water is added to the source of calcium and/or magnesium over a period of time, such as from about 5 seconds to about 2 hours, preferably about 30 seconds. The slaking time is preferably from about 1 minute to about 60 minutes, more preferably about 2.5 minutes to about 15 minutes.

The amount of the silica sand to be admixed with the slaked source of calcium and/or magnesium preferably ranges in the weight ratio of silica sand to slaked source of calcium and/or magnesium (dry) of from about 0.044 to about 2.2, more preferably about 0.048 to about 1.2. The time of admixing of the silica sand and the slaked source of calcium and/or magnesium can preferably range from about 5 seconds to about 2 hours, more preferably about 10 seconds to about 30 seconds. The admixture of silica sand and slaked source of calcium and/or magnesium is preferably treated to continued mixing of from about 1 minute to about 2 hours, more preferably about 5 minutes to about 30 minutes.

The admixing and continued mixing, if any, of the silica sand and the slaked source of calcium and/or magnesium is effective to produce a synthetic silicate suitable for the production of glass. When an excess of water (e.g. free water) is present, the material is in a slurry form. Depending upon the composition and type of glass to be formed using the synthetic silicate, additional material can be added to the slurry during or after admixing or mixing. For instance, if additional silica is desired, a silica source, such as silica flour, can be added. Also, before such synthetic silicate is used in glass production, the slurry can be treated, such as by filtering, evaporating or heating, to remove at least a portion of the free water. For instance, the slurry could be dried at a temperature of about 110° C.

The slaked source of calcium and/or magnesium and the silica sand is further treated by heating at higher temperatures, such as from about 1000° C. to about 1800° C., more preferably from about 1300° C. to about 1400° C. The time and ramping of such heating can be varied, depending upon the desired final synthetic silicate.

In another embodiment of the invention, the silica sand and dolomitic and high calcium limes are pulverized and premixed. The dry mixture is then added over several minutes to the above described ratios of water. The dough-like mixture is then extruded and dried of free water.

The synthetic silicate produced by the silica sand can have a wide variety of one or more magnesium silicate, calcium magnesium silicate and/or calcium silicate components. The variability of synthetic silicate components correlates with the variability of amounts of the source of calcium and/or magnesium, water and the silica sand, as well as the conditions of operating, e.g., temperatures, pressures, time, mixing, etc. Forms of calcium magnesium silicate and/or calcium silicate produced by the present invention include, but are not limited to, Diopside ($CaMgSi_2O_6$), Wollastonite ($CaSiO_3$), Akermanite ($Ca_2MgSi_2O_7$), Merwinite ($Ca_3MgSi_2O_8$), Monticellite ($CaMgSiO_4$), Forsterite ($Mg_2SiO_4$), and the like. In a preferred embodiment, the calcium magnesium silicate and/or calcium silicate glass precursor material is comprised of Diopside and/or Wollastonite.

The diopside and wollastonite made during this solid state reaction differs from other sources of both synthetic and natural wollastonite and diopside in that the scanning electron micrographs show a unique morphology.

In another aspect, the present invention is the setting of process variables within a set of novel process variables to attain desired results. Accordingly, the present invention can be the above-described invention wherein the proportion of the amount of synthetic silicate and the amount of the source of silicon dioxide, preferably silica, is effectively controlled to reduce the temperature required to produce the molten glass within a set time. Alternatively, the proportion of the amount of calcium silicate precursor material and the amount of the source of silica is effectively controlled to reduce the time required to produce the molten glass at a set temperature. The variables which compose the foregoing variables can also be controlled. For instance, the molten glass is produced by setting variables from the set of variables consisting of the amount of slaked source of calcium, the amount of soluble silicate, the amount of free water, the amount of the source of silica, the time to produce the molten glass, and the temperature to produce the molten glass. Once a certain number of the variables have been set, the remaining are fixed in accordance with the degree of freedom. Depending upon the glass composition desired, the amounts of other sources of calcium, magnesium or sodium, such as limestone, dolomite and soda ash, may also be change in accordance with the change of these variables.

Advantages demonstrated in a glass include lower frothing which translates to better heat transfer, lower fining time due to 30% to 400% less gas, better eutectics which shorten the melting times, and possible lowering of soda ash due to the better melting characteristics.

In addition, this material can be made even more cost effectively by utilizing waste heat from the glass furnaces. The synthetic silicate production facility can be located on site at a glass plant. This allows for the use of waste heat and energy from the glass furnace. The synthetic silicate glass batch component can then be easily transported to the glass raw material facility without trucking or railcar charges.

The following examples are to illustrate, but not limit, the production of synthetic silicate using silica sand.

EXAMPLE 5

The following is a method for producing a calcium magnesium silicate, more specifically Diopside. The reaction takes place in a Hobart mixer. A magnesium oxide and calcium oxide source consisting of 600 grams dolomitic lime (56.06% CaO; 38.31% MgO) and 960 g water are simultaneously placed in the mixer. The oxides are allowed to slake for 15 minutes, which is to allow for maximum viscosity. The slaked calcium and magnesium source is then screened through a 30 mesh screen to remove impurities. To the mixing oxides is added 702 grams of dry 30 mesh silica sand. This provides enough silicon dioxide to react with all the magnesium and calcium oxide in a 1:1 molar ratio. The slurry is allowed to mix for 10 minutes. Upon completion of the reaction the free water is removed in an oven at 110° C. The dried material is then heated to 1375° C. for 15 minutes in a kiln. The phase formed in this reaction is confirmed by x-ray diffraction (XRD) to be >98% diopside ($CaMgSi_2O_6$).

EXAMPLE 6

The method wherein a diopside ($CaMgSi_2O_6$) precursor is used in glass. The glass formulation followed is 74.1% $SiO_2$, 13.3% $Na_2O$, 8.6% CaO, and 4.1% MgO. The precursor material consists of 77.2% of the needed CaO and MgO, and 16.5% of the required $SiO_2$. Therefore, to 22.4 grams precursor material is added 61.9 grams $SiO_2$ as 30 mesh sand, 5.43 g calcium carbonate as 53.04% CaO, and 22.6 g soda ash as 58.5% $Na_2O$. A control consisting of the above mentioned glass formulation using calcium carbonate as the CaO source, dolomite as MgO/CaO source, 30 mesh sand as the $SiO_2$ source, and soda ash as the $Na_2O$ source is created. Two groups of these mixtures are then heated to various temperatures and allowed to dwell for a period of time. In every case a control glass was run side by side in the furnace. The glass samples are ground up and XRD performed on them. The % amorphous glass for these samples are as follows.

| temperature/time | % Amporphous Glass (Control Glass) | % Amporphous Glass (Experimental Glass) |
| --- | --- | --- |
| 783° C./30 minutes | 5 | 7 |
| 817° C./30 minutes | 7 | 10 |
| 875° C./30 minutes | 25 | 30 |
| 1000° C./30 minutes | 45 | 50 |
| 1100° C./30 minutes | 65 | 70 |
| 1300° C./1 hour | 95 | 98 |
| 1400° C./1 hour | 96 | 100 |

In addition, thermal gravimetric analysis/differential thermal analysis (TGA/DTA) show the glass with the diopside material required less energy and has fewer endotherms than the glass control. On a theoretical basis, the glass using diopside type of synthetic silicate needs 13.8% less energy than the control glass. This is due mostly to the less need for decarboxylation in the glass using diopside type synthetic silicate.

Synthetic Silicate Pellets

In another embodiment, the present invention is a process for producing a synthetic silicate pellet which can be further processed into synthtic silicate particles. The synthetic silicate is produced by either of the soluble silicate route or the silica sand route. The preferred process for producing such particles comprise the following steps:

1) producing a mixture by admixing (a) silicon dioxide, preferable sand, (b) calcium oxide and/or magnesium oxide, preferably dolomitic lime or high calcium lime, and (c) water;
2) forming an undried mass from such mixture, such as extruding an undried pellet;
3) drying the undried mass, e.g. pellet, to drive off water, preferably to attain structural strength sufficient for handling and/or to control degradation in a reaction process;
4) reacting the unreacted mass to produce a desired synthetic silicate, preferably a diopside product pellet, preferably the reaction taking place in a kiln or microwave device, under controlled condition to produce the desired product; and
(5) reducing the synthetic silicate product to a desired particle size for use in a glass production component.

Step (1) is effectively performed to control the ratio of material, which is important in arriving at the "green" strength of the prereacted pellet as well as the composition of the desired synthetic silicate product pellet. When using magnesium oxide alone in step (1) without the presence of calcium oxide, then additional optional techniques may be required to produce a pellet, such as utilizing enhanced pressures or binders.

Step (2) forming of a mass is effectively controlled to enhance the green strength and to control the reaction to produce the desired synthetic silicate product pellet. Such control can be in the forming dye plate configuration and the forming pressures. Considerations include, but are not limited to, the density and water content of the formed pellet. Preferably, such forming is by extrusion or pan pelletizing. Preferably, the undried pellets are formed from a slaked mixture of calcium oxides and/or magnesium oxides, more preferably lime, and sand and are extruded into a cylindrical shape of diameter ranging from one quarter inch to several inches with a preferred aspect ratio (diameter to central axis) of less than about one. The cylindrical shape affords a better reaction in the rotary kiln, as well as less dusting. Uniform pellet sizes allow for a uniform reaction with little to no glass formation in the kiln. The prefired pellets are dense, white cylinders. When heated, the pellets become porous due to the release of the water of hydration and the diopside reaction. This porous structure of the post fired pellet allows for easier grinding to a selected particle size, preferably to a particle size range of about −30 mesh to about +100 mesh.

The analyzed composition (in weight percentages) of these unreacted pellets are from about 3% to about 18% magnesium oxide, from about 6% to about 34% calcium hydroxide, from about 0% to about 27% calcium carbonate, from about 0% to about 22% magnesium carbonate, and from about 48% to about 60% silica sand. More preferably the composition consists of from about 16% to about 17.5% magnesium oxide, from about 30% to about 34% calcium hydroxide, and from about 50% to about 54% silica sand. A composition wherein the weight percentage of calcium hydroxide is less than about 6% will no longer have the green pellet strength necessary to prevent build up and dusting in a calciner. These "green" pellets of unique composition are a form very conducive to calcining in a large production facility.

Accordingly, another embodiment of the present invention is an unreacted pellet of the above described composition which can be reacted to form synthetic silicate, such pellet having a cylindrical shape with a diameter of at least about one quarter of an inch and an aspect ratio (diameter to central axis) less than about one, the synthetic silicate being a calcium magnesium silicate, magnesium silicate, and/or calcium silicate.

Step (3) dries the formed undried pellet to an unreacted pellet. The drying conditions are controlled primarily in the rate of drying and final moisture content of the unreacted pellet. The drying conditions can be effectively controlled to attain greater green strength.

Step (4) reacting is effectively controlled to produce a desired synthetic silicate, such as diopside or wollastonite (but not necessarily limited to such). Such reacting is effectively controlled in the time and temperature of the reaction. The green strength of the pellet is effective to prevent undesired pellet degradation which results in dusting, refractory build-up, such as adhesion to refractory surfaces, loss of reaction control, non-uniformity of reaction, such as differing rates of melting, and other negative reaction conditions which are typical in powder form feeds of material to high temperature processes. The temperature for reaction is preferably above about 700° C., more preferably above about 1000° C., even more preferably about 1350° C. to about 1400° C. Higher temperatures are possible, but the temperature should not be such that melting or other structural degradation occurs.

Step (5) is reducing the fired synthetic silicate pellets to a desired particle size for use in a glass production component. Such reduction can be by grind\ding processes or other known reduction means with appropriate screening, if desired.

A preferred embodiment is the formed pellet produced by steps (1) through (3) stated herein above.

Another preferred embodiment is the synthetic silicate pellet produced by steps (1) through (4) stated herein above.

Yet another preferred embodiment is the glass produced by use of the material produced by steps (1) through (3) stated herein above.

Yet still another preferred embodiment is the glass produced by use of the material produced by steps (1) through (4) stated herein above.

And yet another preferred embodiment is the glass produced by use of the material produced by steps (1) through (5) stated herein above.

The following example is to illustrate, but not limit, the synthetic silicate pellet of the present invention:

EXAMPLE 7

Dolomitic lime and calcium oxide (eg. Quicklime) are fed into a reactor together with water and silica sand. The slaked reactant is fed into a drier at about 200° C. and there is obtained therefrom a pellet form which is fed into an extruder to form dried pellets. The dried pellets are then calcined at about 1350° C., then crushed and screened before being supplied to a glass-making machine.

What is claimed is:

1. A process for producing synthetic silicate particles comprising the following steps:
    1) producing a mixture consisting essentially of the mixture produced by admixing (a) sand, (b) calcium oxide, (c) magnesium oxide, and (d) water; and an optionally (e) calcium carbonate or (f) magnesium carbonate or both (e) and (f).
    2) forming by extrusion or pan palletizing an undried pellet from such mixture;
    3) drying the undried pellet either to drive off water to attain structural strength sufficient for handling or to control degradation in a reaction process or both, said pellet having by weight from about 3 percent to about 18 percent magnesium oxide, from about 6 percent to about 34 percent calcium hydroxide, from about 0 percent to about 27 percent calcium carbonate, from about 0 percent to about 22 percent magnesium carbonate and from about 48 percent to 60 percent sand;
    4) reacting the pellet to produce a synthetic alkaline earth silicate product; and
    5) comminuting the synthetic silicate product to a particle size of from about −30 mesh to about +100 mesh for use as a glass production component.

2. The process of claim 1, wherein silicon dioxide is silica sand.

3. The process of claim 2, wherein the ratio of step (1) components is effectively controlled to produce an undried prereacted pellet strength to form an extruded pellet.

4. The process of claim 3, wherein the extruded pellet has an aspect ratio of less than about one to one.

5. The process of claim 3, wherein the synthetic silicate product in step (5) is reduced to a particle size range of about −30 to about +100 mesh.

6. The process of claim 3, wherein the step (4) reacting is performed at a temperature above about 700 degrees Celsius.

7. The process of claim 3, wherein the calcium hydroxide content is at least about 6%.

8. The process of claim 3, wherein the synthetic silicate product produced in step (4) is porous.

9. A process for producing synthetic silicate particles comprising the following steps:
    1) producing a mixture consisting essentially of the mixture produced by admixing (a) sand, (b) calcium oxide, (c) magnesium oxide, and (d) water;
    2) forming by extrusion or pan palletizing an undried pellet from such mixture;

3) drying the undried pellet either to drive off water to attain structural strength sufficient for handling or to control degradation in a reaction process or both, said pellet having by weight from about 3 percent to about 18 percent magnesium oxide, from about 6 percent to about 34 percent calcium hydroxide, and from about 48 percent to 60 percent sand;

4) reacting the pellet to produce a synthetic alkaline earth silicate product; and 5) comminuting the synthetic silicate product to a particle size of from about −30 mesh to about +100 mesh for use as a glass production component.

* * * * *